Dec. 2, 1969
J. PASSMORE
3,481,187
METHOD FOR DETERMINING THE EFFECTIVENESS OF ANTI-CAKING AGENT
Filed Dec. 19, 1966
2 Sheets-Sheet 1
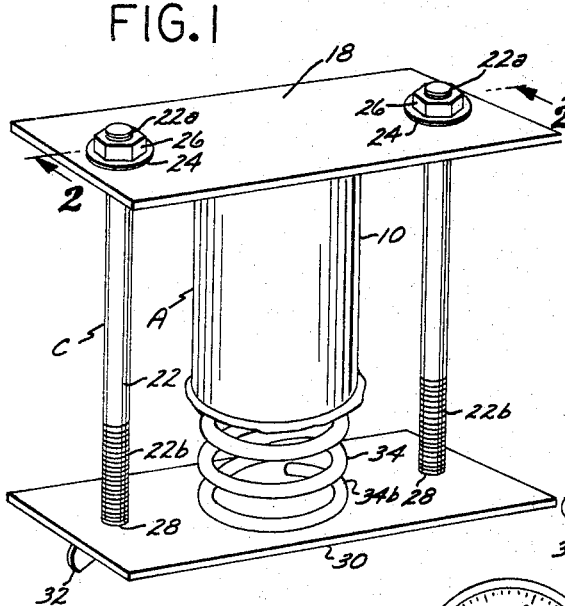
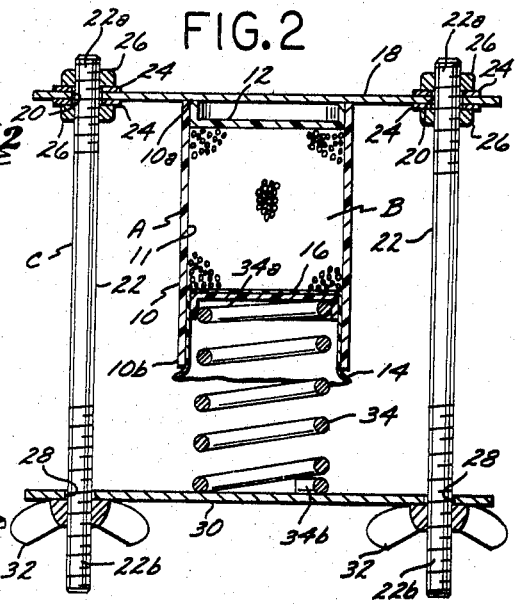
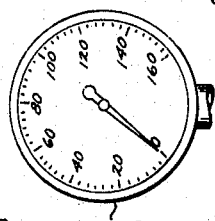
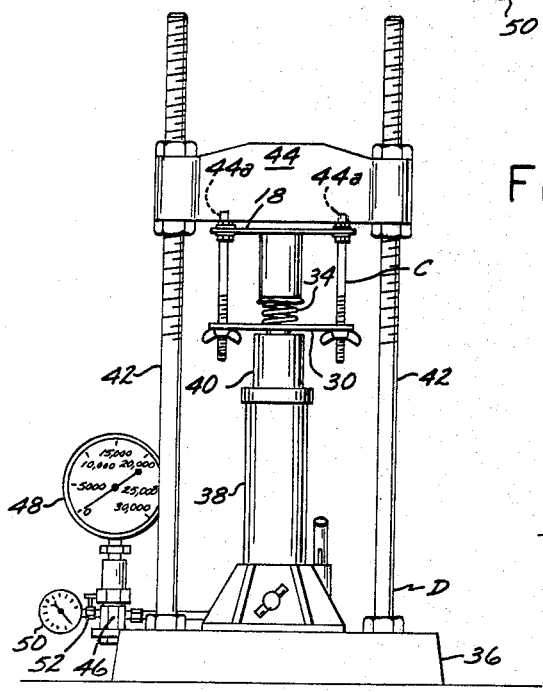
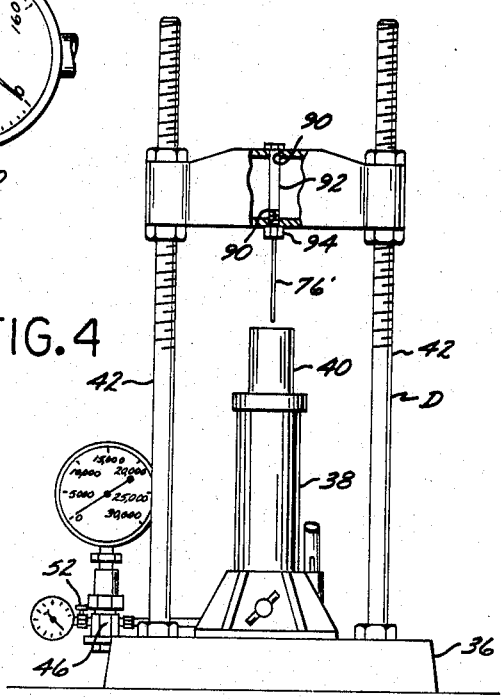
INVENTOR.
JAMES PASSMORE
BY
William C. Babcock
ATTORNEY

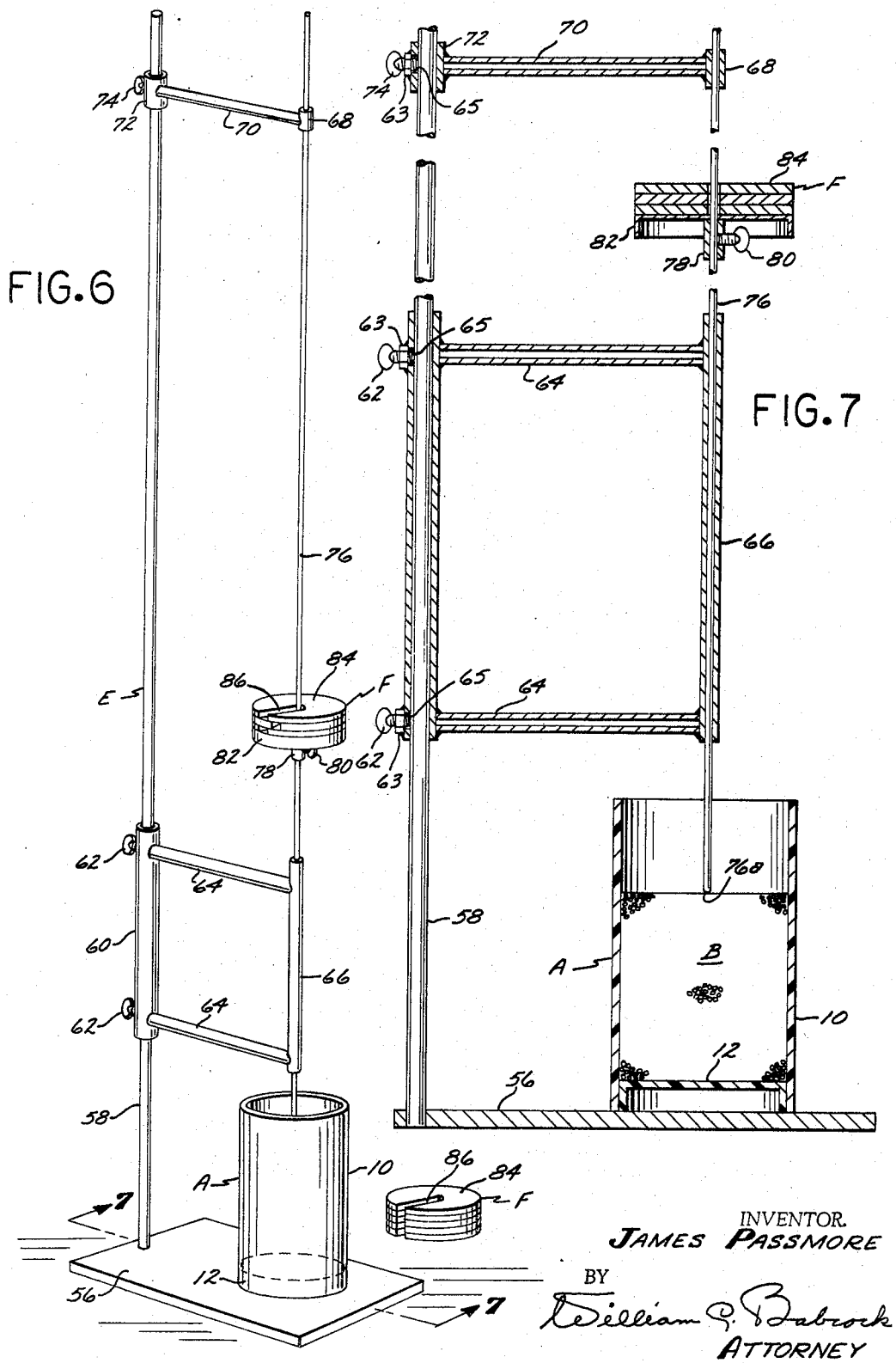

United States Patent Office 3,481,187
Patented Dec. 2, 1969

3,481,187
**METHOD FOR DETERMINING THE EFFECTIVE-
NESS OF ANTI-CAKING AGENT**
James Passmore, Long Beach, Calif., assignor to Petro-
chemicals Company, Inc., Fort Worth, Tex.
Filed Dec. 19, 1966, Ser. No. 608,717
Int. Cl. G01n 3/48
U.S. Cl. 73—81    6 Claims The present invention relates generally to laboratory equipment, and more particularly to a penetrometer and method of using the same to determine the effectiveness of an agent in anti-caking a particled material that tends to coalesce over a period of time when subjected to pressure or temperature changes.

During the past few years, the use of anti-caking agents to minimize the tendency of certain particled material to coalesce into lumps or hard masses has become increasingly common. When such a material is not substantially free-flowing, the purchaser in most instances is put to substantial expense to place it in a usable form. Obviously, from an economic standpoint, a user of particled material that tends to coalesce after standing for any length of time would prefer to purchase material that has been anti-caked over material which has not been so treated.

The anti-caking of particled material to meet the market demand is one that presents several problems to a manufacturer. First, the anti-caking operation involves extra expense, and hence manufacturers generally use just as little of an agent per ton of material being treated as possible to produce satisfactory results. Secondly, the anti-caking agent normally serves this function only, and it is highly desirable that the increase in weight of the treated material be held to a minimum, in order that the shipping costs thereon paid by purchasers will be held at a minimum.

Both the quantity of anti-caking agent added, and the increase in weight of the treated material, are of particular importance when the treated material is sold at a relatively low price per ton, such as ammonium nitrate, urea, and the like, which are frequently shipped long distances.

Prior to the present invention there has been no laboratory equipment or method available for satisfactorily determining the anti-caking effect of an agent on a particled material that would consistently correlate with the results obtained when the operation is carried out on a large scale in a commercial operation.

A major object of the present invention is to provide a laboratory instrument in the form of a penetrometer and method of using same by means of which it is possible to determine the quantity of an agent which must be added to a particular particled material to render it free-flowing and easily handled.

Another object of the invention is to supply a penetrometer and method of using the instrument to accurately predict the anti-caking results attainable when a predetermined quantity of anti-caking agent is added to particled material under commercial conditions.

A still further object of the invention is to provide a penetrometer and method of using the same that permits a tabulation to be prepared that shows the increasing effectiveness of an anti-caking agent as increasingly greater quantities thereof are added to the particled material.

These and other objects and advantages of the invention will become apparent from the following description thereof, and from the accompanying drawings illustrating the same, in which:

FIGURE 1 is a perspective view of a sample retaining device;

FIGURE 2 is a longitudinal cross-sectional view of the device shown in FIGURE 1, taken on the line 2—2 thereof;

FIGURE 3 is an end elevational view of a Carver press with the sample retaining device mounted thereon;

FIGURE 4 is an end elevational view of the Carver press transformed to test a hard-caked sample;

FIGURE 5 is a front elevational view of a low pressure hydraulic gauge used on the transformed press shown in FIGURE 4;

FIGURE 6 is a perspective view of a penetrometer; and

FIGURE 7 is a longitudinal cross-sectional view of the penetrometer shown in FIGURE 6, taken on the line 6—6 thereof.

To determine the effectiveness of an anti-caking agent on a particled material that tends to coalesce after standing under pressure, or when subjected to temperature changes, a number of samples of the co-mingled agent and material are prepared. Each sample should be of the same weight of particled material, but vary in weight as to the agent contained therein. By tabulating the test results run on these samples, as will hereinafter be explained in detail, the anti-caking effect of gradually increasing weight of the agent to a particled material becomes readily apparent.

In the past various materials have been used as anti-caking agents, such as finely divided kaolin, diatomaceous earth, calcium carbonate, silica, and the like, both individually, as well as when coated with an organo sulfonate. An organo sulfonate frequently used, both individually, and as an anti-caking agent in combination with such finely divided materials, is Petro AG Special, manufactured by Petrochemicals Company, Inc., of Fort Worth, Tex.

In the testing of each sample for the effectiveness of the anti-caking agent contained therein, a Mason jar (not shown), and the tare on a scale (not shown) is adjusted to balance the jar. A portion of the sample is then placed in the jar and weighed. The contents of the jar should weigh between 40 and 50 grams. The jar is then securely capped and rotated for a sufficient period of time to thoroughly tumble the sample contained therein. From experience, a one-minute period has been found to be satisfactory.

A number of cylindrical shells 10 in the form of sections of plastic pipe are provided. The shells 10 are preferably of polyethylene, or P.V.C. and approximately 3" by 1½" in size. A first end 10a of each section 10 is closed by a conventional cap 12 having a cylindrical side wall, as shown in FIGURE 2. The cap 12 slidably and snugly engages the interior surface of end section 10a. Each shell 10 and cap 12 inserted therein cooperatively provide a container A in which one of the samples can be poured after being tumbled in its jar.

The second end 10b of shell 10 is sealed by placing a small piece of a thin pliable plastic film 14 therein, which is thereafter engaged by a second cap 16 of the same structure as that of cap 12. The second cap 16 and film 14 are slidably movable relative to the interior surface of section 10. One of the shells 10 is shown in FIGURE 2 containing a sample B of the material to be tested, with the end portions thereof being closed by caps 12 and 16. Either of the caps 12 or 16 can be moved longitudinally relative to the shell 10 to vary the volume of a confined space 11 therein that is occupied by sample B. As the volume of space 11 is decreased the pressure on sample B is increased.

A number of sample-retaining devices C are provided, the detailed structure of one of which is shown in FIGURE 2. Each retaining device C includes a first, relatively thin elongate cross piece 18, in the end portions of which two openings 20 are formed. Two parallel rods 22 that have threaded end portions 22a and 22b are provided. Threaded end portions 22a extend through openings 20. Washers 24 and nuts 26 are mounted on end portions 22a (FIGURE 2). When the nuts 26 are rotated on portions 22a to move towards one another, the washers 24 and cross piece 18 are gripped therebetween. The rods 22 are thus supported in fixed, parallel positions extending outwardly on cross piece 18.

The threaded end portions 22b slidably engage two spaced openings 28 formed in a second elongate cross piece 30. Wing nuts 32 also engage the end portions 22b, as shown in FIGURE 2. When nuts 32 are rotated in a first direction the second cross piece 30 is moved towards the cross piece 18.

A first helical spring 34 is provided, a first end 34a of which is in abutting contact with second cap 16, while the second end 34b of the spring is in contact with cross piece 30. By rotating the wing nuts 32, the second cross piece 30 may be so disposed relative to first cross piece 18 that the spring 34 and second cap 16 cooperatively maintain a desired pressure on the sample B as shown in FIGURE 2.

In carrying out the test it is necessary that all samples B be subjected to the substantially same pressure. For this purpose a conventional Carver laboratory press D may be employed in the manner shown in FIGURE 3. The press D includes a base 36 on which a hydraulic cylinder 38 is mounted that slidably supports a ram 40. Spaced uprights 42 are secured to base 36 and support a vertically adjustable cross-head 44 therebetween above the ram 40.

Hydraulic fluid under pressure is discharged into cylinder 38 through a tubular assembly 46 connected to a high pressure gauge 48. A low pressure gauge 50 is also connected to the assembly 46, that is graduated from 0 to 160 pounds. A shut-off valve 52 is disposed between gauge 50 and assembly 46, to prevent damage to the gauge 50 when high pressure fluid is discharged to the cylinder 38.

After placement of a sample B in a container A mounted in a retaining device C, the device C is positioned in press D, as shown in FIGURE 3. Low pressure hydraulic fluid is gradually discharged into cylinder 38 to move ram 40 upwardly. This upward movement of ram 40 moves second cross piece 30 towards first cross piece 18, and compresses spring 34. The compressed spring 34 exerts an upwardly directed force on second cap 16 and sample B, whereby space 11 in shell 10 between caps 12 and 16 decreases in volume until sample B is subjected to a desired pressure. This pressure normally is the maximum pressure to which the material of this sample will be subjected when stored commercially. Thereafter hydraulic fluid is discharged into cylinder 38 until the gauge 50 registers a pressure of twenty-five pounds, which is held for ten seconds. This pressure is then released, and brought back to twenty-five pounds.

At this point the wing nuts 32 are screwed upwardly into abutting contact with second cross piece 30, and further rotated until a slight drop in pressure is noted on the gauge 50. Pressure on the hydraulic fluid actuating press D is then released and the retaining device C removed from the press. Thereafter device C is placed in a conventional rack (not shown) in storage for seven days. The storage area is at ambient temperatures. This procedure is conducted on each of the other samples B.

In the event the samples B are ammonium nitrate, the retaining devices C containing the same are placed in an oven capable of giving a cycled temperature from ambient to 120° F., using two four-hour heating cycles, and two four-hour cooling cycles.

Upon completion of the last cycle for ammonium nitrate or at the end of a seven-day period, the retaining devices C are sequentially removed from the oven or storage and the wing nuts 32 carefully removed. The springs 34 and the caps 16 are also removed from the containers A. Each of the containers are inverted in succession over previously tared beakers (not shown), and the weight of the sample B flow from each container noted.

If the weight of the sample B poured from one of the containers A is small, and the sample remaining in the container appears to be caked, this particular sample is subjected to further testing by the penetrometer E shown in FIGURES 6 and 7. Should the remaining portion of a sample B be so severely caked that it cannot be tested by use of the penetrometer E, the press D is transformed to perform this test in the manner shown in FIGURE 4.

The penetrometer E (FIGURES 6 and 7) includes a base 56 on which a vertical upright 58 is mounted. An elongate tubular sleeve 60 is slidably mounted on upright 58. Two thumb screws 62 engage longitudinally spaced nuts 63 that are rigidly affixed to sleeve 60 and aligned with transverse bores 65 therein. When the screws 62 are tightened the sleeve 60 is frictionally engaged by the ends thereof and held at a desired elevation on upright 58.

Two longitudinally spaced first arms 64 project outwardly from sleeve 60, and serve to support a first vertical elongate bushing 66 on the outer ends thereof. A second bushing 68 is disposed a substantial distance above bushing 66 and is coaxially aligned therewith. Bushing 68 is supported on the outer end of a second horizontal arm 70 that is connected to a second sleeve 72 that slidably engages upright 58. A nut 63 is also mounted on second sleeve 72 in alignment with a transverse bore 65 therein which is engaged by a second thumb screw 74. When thumb screw 74 is tightened, the second sleeve 72, second arm 70, and second bushing 68 are held at a desired elevation on upright 58.

An elongate rigid rod 76 is slidably supported for vertical movement in bushings 66 and 68, as shown in FIGURES 6 and 7. A tubular collar 78 is slidably mounted on rod 76, disposed at a desired elevation thereon between second arm 70 and the uppermost first arm 64. A tapped transverse bore (not shown) is formed in collar 78 that is engaged by a thumb screw 80. When thumb screw 80 is tightened, the collar 78 is held at a desired elevation on rod 76. A horizontal circular platform 82 projects outwardly from the upper portion of the collar. A number of weights F are provided, each of which is formed from a circular plate 84 of substantially the same diameter as that of platform 82. A radially extending slot 86 is formed in each weight F that removably engages the rod 76, as shown in FIGURE 6.

The use of the penetrometer E is relatively simple. After the uncaked portions of the sample B have been poured from the containers A they are successively placed on the base 56, with the cap 12 disposed adjacent thereto, as shown in FIGURES 6 and 7. Each container A, when supported on base 56, is so disposed thereon that the lower end of rod 76 engages the center of the upper surface of the caked sample B remaining in the container (FIGURE 7). Weights F are then placed on platform 82 until a sufficient force is exerted on the flat horizontal lower end 76a of rod 76 as to cause the rod to move downwardly through the caked portion of the sample B and come to rest on the upper surface of cap 12.

The pressure required for the rod 76 to penetrate the caked portion of sample B is calculated by adding the weight of the rod 76, collar 78, thumb screw 80, and platform 82 to that of the weights F on the platform, which is divided by the area of the end 76a of the rod. This operation is conducted on each of the samples B, and the results tabulated.

After determining the force necessary to penetrate the caked portion of each sample B, the container A thereof is inverted once again over the tared beaker (not shown), and the weight of the sample flowing into the beaker noted. If the sample B does not flow from the container A, pressure is manually applied to the sides of the container to liberate the remaining portion of the sample to cause the same to flow into the beaker.

The above procedure permits determination of the uncaked percentage of each sample B with respect to the original weight of the sample, and also permits determination of the amount of samples liberated or broken up during the penetration test. The force required to penetrate the caked portion of each sample B is an indication of the degree of caking, and one that correlates with the degree of caking that takes place commercially when a particular anti-caking agent is used with the material under test.

Results that have been obtained by the use of the penetrometer E in tests as above described are as follow:

TEST NO. 1

(1. Material)
Potassium chloride, 99.95 KCL, U.S. Borax Co., Carlsbad, N. Mex.

(2. Physical Description of Material)

White crystalline KCL; 0.005% moisture.

a. Screen Analysis:
| | |
|---|---|
| 9.1% weight | −50 mesh. |
| 56.3% weight | −50+80 mesh. |
| 12.4% weight | −80+100 mesh. |
| 22.0% weight | −100+236 mesh. |
| Trace | −236 mesh. |

(3. Penetrometer Test Results on Cakes Formed at 12 p.s.i. for Seven Days at Ambient Temperature)

| Sample: | Pressure to Penetrate Cake, p.s.i. |
|---|---|
| Control, no agent | 1,630 |
| ¼ lb. per ton, Petro AGS | 1,160 |
| ½ lb. per ton, Petro AGS | 548 |
| 1 lb. per ton, Petro AGS | 244 |
| 2 lbs. per ton, Petro AGS | 98 |

(4. Physical Condition of Cakes Before and After Test)

| Sample | Before Test | After Test |
|---|---|---|
| Control, No agent | 100% Caked | 81% Caked. |
| ¼ lb. per ton, Petro AGS | 100% Caked | 32% Caked. |
| ½ lb. per ton, Petro AGS | 99% Caked | 21% Caked. |
| 1 lb. per ton, Petro AGS | 98% Caked | 14% Caked. |
| 2 lbs. per ton, Petro AGS | 97.5% Caked | 10% Caked. |

TEST NO. 2

(1. Material)
Urea Prills; 0.013% Moisture.

(2. Penetrometer Test Results on Cakes Formed at 12 p.s.i. for Seven Days at Ambient Temperatures)

| Sample: | Pressure to Penetrate Cake, p.s.i. |
|---|---|
| Control, no agent | 1,060 |
| Urea, 1 lb. Petro AGS per ton | 734 |
| Urea, 1% Asbestol Clay | 1,075 |
| Urea, 2% Asbestol Clay | 1,134 |
| Urea, 3% Asbestol Clay | 980 |
| Urea, 1% Asbestol Clay +3% AGS | 1,040 |
| Urea, 2% Asbestol Clay +3% AGS | 650 |
| Urea, 3% Asbestol Clay +3% AGS | 570 |

The percentages of asbestol clay and Petro AGS in Test No. 2 are by weight.

TEST NO. 3

(1. Material)
Urea Prills; 0.013% Moisture.

(2. Penetrometer Test Results on Cakes Formed at 12 p.s.i. for Seven Days at Ambient Temperatures)

| Sample: | Pressure to Penetrate Cake, p.s.i. |
|---|---|
| Control, no agent | 1,120 |
| Urea, 1% Loomite | 1,040 |
| Urea, 2% Loomite | 750 |
| Urea, 3% Loomite | 610 |
| Urea, 1% Loomite +3% AGS | 325 |
| Urea, 2% Loomite +3% AGS | 366 |
| Urea, 3% Loomite +3% AGS | 366 |

The percentages of Loomite and Petro AGS in Test No. 3 are by weight. Loomite is the trade name of an anti-caking agent produced by the International Talc Company.

In the event that the sample B is so severely caked that it is impossible to penetrate the same by means of rod 76 on penetrometer E, when a reasonable amount of weights F have been added to the platform 82, the Carver press D may be modified in the manner shown in FIGURE 4 to accomplish this result.

The cross-head 44 of the press (FIGURE 4) has two vertically aligned bores 90 formed therein that are coaxially aligned with the center of the ram 40. A bolt 92 extends downwardly through the bores 90, with the lower threaded end of the bolt being engaged by a lock nut 94. A rod 76' of the same transverse cross-sectional area as that of the rod 76 projects downwardly from the lower end of the bolt 92. When a sample B in container A is to be tested, the container is supported on the upper surface of the ram 40. Ram 40 is raised until the lower end of the rod 76' is in contact with the upper surface of the sample B in the same manner as shown in FIGURE 7, and thereafter hydraulic fluid under pressure is discharged into cylinder 38, which causes the ram 40 to rise and the rod 76' to penetrate the sample B. The pressure exerted on the hydraulic fluid is just that required to cause the rod 76' to penetrate the sample B and pass through to contact the cap 12, and is noted on the low pressure gauge 50. Prior to use of the Carver press D to determine the pressure required to permit the rod 76' to penetrate one of the samples B, the resistance and internal drag of the press is determined. To determine the actual pressure required for the rod 76' to penetrate one of the samples B, the pressure registered on the gauge 50 is corrected as follows:

$$P = \frac{A-B}{\pi r^2}$$

A = Ram force, pounds
B = Ram drag, pounds
$\pi r^2$ = Area of tip of rod in square inches
P = Pressure p.s.i.

After the penetration portion of the test has been achieved by use of the Carver press D, the balance of the test is completed in the same manner as described in connection with the penetrometer E described herein.

From experience it has been found that the pressures required to penetrate one of the samples B, either by use of the penetrometer E or the modified form of Carver press D are possible to correlate with the degree of caking that takes place in commercial practice when the material under test is stored under pressure conditions. Thus, the above described procedure provides an accelerated laboratory test that permits a determination of the potential commercial success of a given chemical being rendered permanently free-flowing which is readily handled by the addition of a predetermined quantity of anti-caking agent thereto. To assist in aligning sample-retaining devices C in press D, two spaced upwardly extending recesses 44a are formed in crosshead 44. The recesses 44a are removably engaged by the upper portions of rod 22.

Although the present invention is fully capable of achieving the objects and providing the advantages hereinbefore mentioned, it is to be understood that it is merely illustrative of the presently preferred embodiments thereof and I do not mean to be limited to the details of construction shown and described, other than as defined in the appended claims.

I claim:
1. A laboratory method of determining the effectiveness of an agent in anti-caking a particled material that tends to cake when stored under pressure that comprises the steps of:
   (a) treating a portion of said material of a first pre- determined weight to a second predetermined weight of said agent to provide a testing sample;
(b) positioning said sample in a confined space of variable volume;
(c) subjecting said sample in said confined space to a predetermined pressure;
(d) maintaining said predetermined pressure on said sample for a predetermined length of time;
(e) releasing said predetermined pressure from said sample;
(f) pouring any free flowing part of said sample from said confined space;
(g) disposing the lower flat end of a vertically movable elongate rigid body on the upper surface of the part of said sample that does not pour from said confined space;
(h) sequentially subjecting said body to an increasing downwardly directed force until a force is found that causes said body to penetrate said part of said sample that is not free flowing;
(i) subjecting a sample of said material to which said agent is not added to the same procedure as applied to said sample treated with said agent; and
(j) comparing the forces required to move said body through the treated and untreated samples to determine the effectivenes of said agent in anti-caking said material.

2. A laboratory method as defined in claim 1 in which said sample in said confined space is subjected to said predetermined pressure by applying a force to said closure in a direction that tends to reduce the volume of said confined space.

3. A laboratory method as defined in claim 1 in which said predetermined pressure exerted on said sample in said confined space is the maximum pressure to which said material will be subjected when stored commercially.

4. A laboratory method as defined in claim 1 which in addition includes the step of:
(k) alternately heating and cooling said samples in said confined space for periods of time of predetermined duration while maintaining said sample at substantially said predetermined pressure.

5. A laboratory method as defined in claim 1 in which said increasingly greater force exerted on said body is provided by hydraulic fluid under increasingly greater pressure.

6. A laboratory method as defined in claim 1 which includes the further step of:
(k) weighing the part of said sample that pours from said confined space to determine the percentages by weight of said sample that remained caked after being treated by said agent.

References Cited

Hogentogler, C. A.: Bulletin of the National Research Council, Apparatus Used in Highway Research Projects in the U.S., pp. 32, 33, August 1923.

RICHARD C. QUEISSER, Primary Examiner

J. K. LUNSFORD, Assistant Examiner